(12) United States Patent
Tateishi

(10) Patent No.: US 7,256,962 B2
(45) Date of Patent: Aug. 14, 2007

(54) MAGNETIC TAPE DRIVE WITH AC ERASE ELEMENT UPSTREAM FROM PLURAL HEAD ELEMENTS

(75) Inventor: Seiji Tateishi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 413 days.

(21) Appl. No.: 10/910,355

(22) Filed: Aug. 4, 2004

(65) Prior Publication Data

US 2005/0047008 A1   Mar. 3, 2005

(30) Foreign Application Priority Data

Sep. 1, 2003   (JP)   ............................. 2003-308262

(51) Int. Cl.
*G11B 5/265*   (2006.01)
(52) U.S. Cl. ...................................... 360/121; 360/118
(58) Field of Classification Search ................ 360/118, 360/121
See application file for complete search history.

(56) References Cited

U.S. PATENT DOCUMENTS

| | | | | |
|---|---|---|---|---|
| 4,466,027 A | * | 8/1984 | Howell et al. | ................ 360/66 |
| 5,057,948 A | * | 10/1991 | Lutzeler | ...................... 360/66 |
| 5,689,384 A | | 11/1997 | Albrecht et al. | |
| 5,898,534 A | * | 4/1999 | Gray | ....................... 360/77.01 |

FOREIGN PATENT DOCUMENTS

| | | |
|---|---|---|
| JP | 7-182602 A | 7/1995 |
| JP | 8-30942 A | 2/1996 |

* cited by examiner

*Primary Examiner*—Julie Anne Watko
(74) *Attorney, Agent, or Firm*—Sughrue Mion, PLLC

(57) ABSTRACT

A magnetic head including a plurality of head element units provided along a width direction with respect to a magnetic tape. Each head element unit is provided with at least one recording element for recording a data signal on the magnetic tape and at least one reproducing element for reproducing a data signal from the magnetic tape. In each head element unit, an AC erase head for performing AC erase on a data track of the magnetic tape is positioned upstream in a tape travel direction with respect to the recording element.

12 Claims, 7 Drawing Sheets

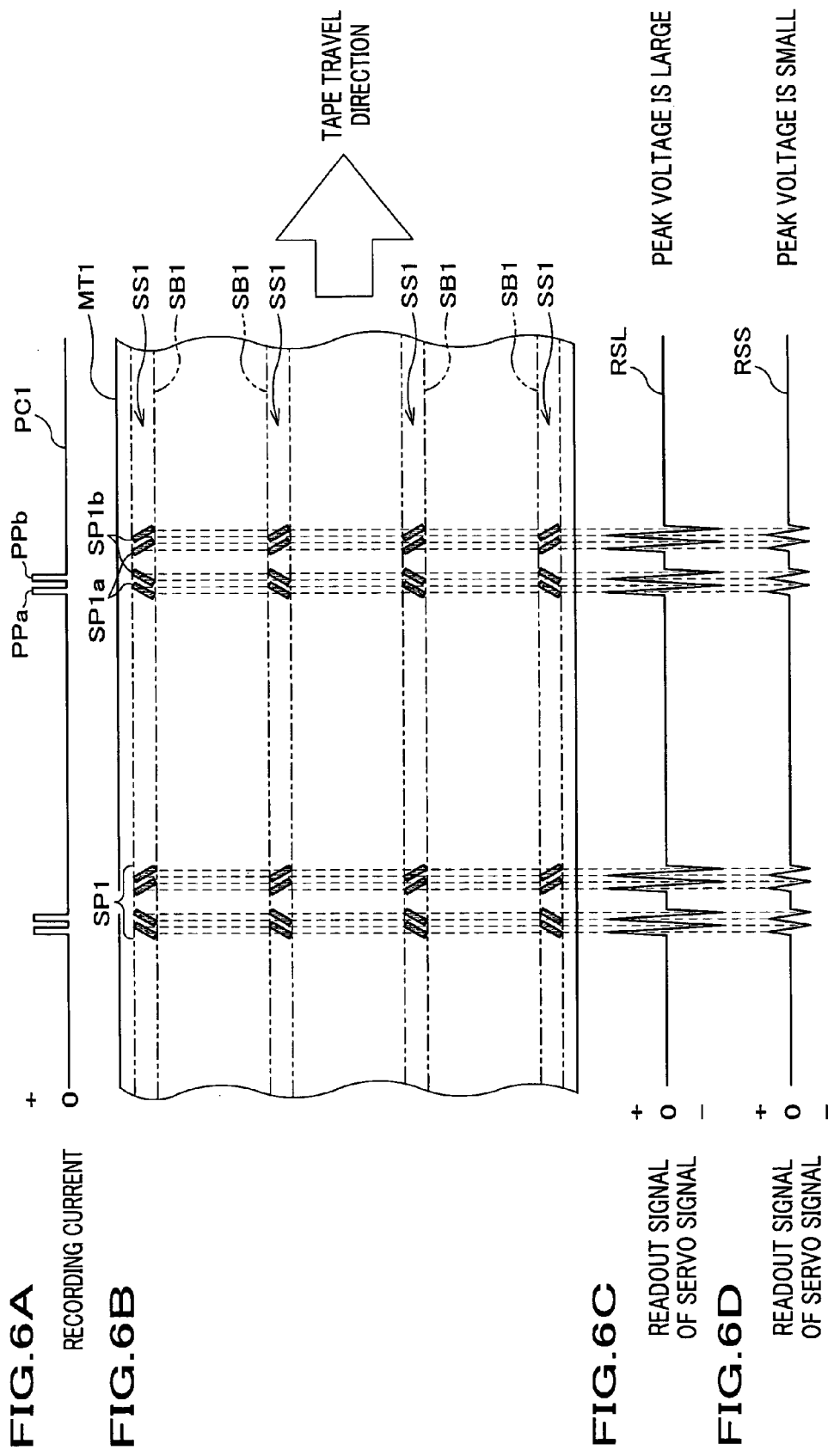

MAGNETIC TAPE DRIVE WITH AC ERASE ELEMENT UPSTREAM FROM PLURAL HEAD ELEMENTS

BACKGROUND OF THE INVENTION

1. Field of the Invention

The present invention relates to a magnetic head of a magnetic tape drive.

2. Description of Relevant Art

In recent years, recording capacity of a magnetic recording medium has been developed, and a magnetic recording medium, which is used for saving data of computer and whose recording capacity is more than 100 G bytes, has been brought to the market.

In case of a magnetic tape, for example, the recording capacity thereof is increased by providing several hundreds of data tracks along a width direction of the magnetic tape. Thus, the distance between adjoining data tracks and the width of the data track become quite narrow as the recording capacity becomes large.

Therefore, the method disclosed in Japanese unexamined patent publication H08-30942, which is adopted in order to trace the data track accurately by a recording/writing element of a magnetic head, has been discovered.

In this Japanese patent publication, the magnetic head positioning servo control of the magnetic head, that is a positioning control in a width direction of the magnetic tape, is performed while reading a servo signal, which is preliminarily written on the magnetic tape, by a magnetic head.

The servo signal of these kinds is written on a servo band of the non-magnetized magnetic tape, by applying a recording current so that the direction of the magnetization is aligned in one direction.

That is, as shown in FIG. 6B, in case of conventional servo signal SS1, the servo signal is recorded on the non-magnetized magnetic tape, by applying a recording current PC1, which is composed of a zero current and a plus pulse current and which is shown in FIG. 6A, on the non-magnetized servo band SB1. This is because it is required to prevent the occurrence of the saturation of the magnetization of a servo read element (not shown).

According to this recording current PC1, the servo band of the magnetic tape MT1 is not magnetized while the recording current PC1 is a zero current, but the servo band is magnetized when a plus pulse current is supplied as the recording current PC1. In this occasion, the region where the plus pulse current is applied is magnetized in one direction and this region serves as the servo pattern SP1. Thereby, the servo signal SS1 composed of a group of servo patterns SP1 is written on the servo band SB1.

Here, a head gap of a magnetic head (not shown), which is used for writing the servo signal SS1, has a shape of non-parallel symmetrical patterns, and each pattern thereof has a predetermined intersection angle with respect to a traveling direction of the magnetic tape MT1. Therefore, as shown in FIG. 6A and FIG. 6B, the servo pattern SP1*a* being composed of non-parallel symmetrical patterns is formed by the magnetization by the plus pulse current PPa, and also the servo pattern SP1*b* is formed by the magnetization by the plus pulse current PPb.

In the magnetic tape drive, using a servo read element, the change of the magnetic field on the servo signal SS1 is detected. This servo read element detects the change of the magnetic field by measuring the change in electric resistance, and outputs the measured value as a readout signal in the form of the differential waveform (see FIG. 6C and FIG. 6D).

Here, since the readout signal is indicated as a value of voltage, the peak voltage of the readout signal becomes large as the change of the electric resistance measured by the servo read elements becomes large. Thus, the S/N (signal/noise) ratio of the readout signal is improved as the change of the electric resistance becomes large.

Therefore, as shown in FIG. 6C, the peak voltage of the readout signal RSL of the servo signal SS1 becomes large, when the variation of the magnetic field of the servo signal SS1 itself is large or the area to be traced by the servo read elements is wide because of the large width of the servo read element.

The recording capacity of the magnetic tape per volume may be increased to dozens of terabytes order in the near future. In this case, the number of the data tracks is increased in order to increase the recording capacity and thus the distance between adjoining data tracks and the width of the data track become narrow. Additionally, the thickness of the magnetic tape may be decreased together with the increasing of the recording capacity.

Thereby, the magnetic charge that can be detected while performing the readout of the servo signal SS1 is decreased, and the variation of the magnetic charge on the servo signal SS1 that are detected by the servo read element becomes small.

Thus, as shown in FIG. 6D, the peak voltage of the readout signal RSS of the servo signal SS1 becomes small, and the S/N ratio of the readout signal RSS becomes worse. These defects disturb the accurate readout of the servo signal SS1 and the accurate positional control of the magnetic head of the magnetic tape drive.

As an example of the technique for overcoming these defects, the technique disclosed in Japanese patent application No.2003-110396 (not yet published) can be cited.

In this patent application, by using an erase element (not shown) provided on the magnetic head of the servo writer, the servo signal SS2 being comprised of a plurality of servo patterns is written on a part of the servo band SB2, a region of which is being magnetized in one direction with respect to the longitudinal direction of the magnetic tape MT2.

In this case, a direction of the magnetization of each servo pattern of the servo signal SS2 is in the opposite direction with respect to that of the servo band SB2. That is, in case of the magnetic tape MT2 shown in FIG. 7A, the direction of the magnetization of the servo signal SS2 (servo pattern) is a left direction, and that of the servo band SB2 is a right direction. Here, referring to FIG. 7A, the direction of the magnetization is shown by a small arrow.

In this magnetic tape MT2 of shown in FIG. 7A, the direction of the magnetization is reversed at the boundary between the servo pattern SP2 and the servo band SB2. That is, the direction of the magnetization is reversed at the boundary between the servo band SB2 whose direction of the magnetization is a right direction in FIG. 7A and the servo pattern SP2 whose direction of the magnetization is a left direction in FIG. 7A.

These arrangements of the servo pattern SP2 enlarge the variation of the signal (readout signal) (see FIG. 7B) obtained by the readout of the servo signal SS2 that is performed by the servo read element S2 provided on the magnetic head H2 of the magnetic tape drive. Thus, the S/N ratio of the readout signal of the servo signal SS2 can be improved.

In other words, since the variation of readout signal at the boundary between the servo band SB2 and the servo pattern SP2 becomes large, the S/N ratio is improved.

In this technique, however, the magnetic head positioning servo control of the servo writer cannot be performed, when performing the magnetization of the servo band SB2 using the erase element in order to align in one direction the direction of the magnetization of servo band SB2. Hereinafter, aligning in one direction the direction of the magnetization is defined as "direct-current erase".

This makes it difficult to perform the direct-current erase only on the servo band SB2. Thus, the data band DB2, onto which data signal is being recorded, is subjected to the direct-current erase in addition to the direct-current erase of the servo band SB2 when performing the direct-current erase on the servo band SB2.

Under this condition, if the recording of the data signal is performed using a recording element W2 provided on the magnetic head H2 of the magnetic tape drive and the reproducing of this data signal is performed by a reproducing element R2 provided on the magnetic head H2, the reproduced data signal may include a noise.

Here, an unevenly-coated magnetic particle layer of the magnetic tape MT2, that is, thickness variation of the magnetic particle layer is one of factors causing a noise.

FIG. 8 is a cross-sectional view of the magnetic tape MT2, in which a magnetic particle layer 21 is provided on a base 20.

Referring to FIG. 8, when performing the recording of data signal after the direct-current erase, if the thickness variation exists on the magnetic particle layer 21, data signal is only recorded on a surface layer 21a of the magnetic particle layer 21. That is, in this case, data signal is only recorded on the surface layer 21a at constant depth and is not recorded on a under layer 21b. Thus, the alignment of the direction of the magnetization caused by the direct-current erase is still remaining in the under layer 21b.

As can be seen from FIG. 8, since the boundary face between the surface layer 21a and the under layer 21b is undulating due to the thickness variation of the magnetic particle, the magnetization of the under layer 21b gives an unfavorable influence on the surface layer 21a as a leakage flux. That is, this leakage flux causes a noise when performing the reproducing of data signal.

This noise especially may be large, if the thickness of the magnetic tape MT becomes thin due to the development of the high density recording technique. This is because the thickness variation of the magnetic particle layer will occur with ease as the thickness of the magnetic tape becomes thin.

As an example of measures for minimizing the occurrence of a noise, the magnetic tape drive disclosed in Japanese unexamined patent publication No. H07-182602 can be cited.

In this magnetic tape drive, an AC erase head (alternating current erase head) is provided at upstream, with respect to the travel direction of the magnetic tape, of the magnetic head, which is used for recording and reproducing of data signal.

According to this magnetic tape drive, the magnetic particles in the magnetic particle layer of the data band DB2 are, prior to the recording of data signal, aligned in a random direction by the AC erase head, even if the direct-current erase is performed on the data band DB2.

That is, the direction of the magnetization of the data band DB2 can be aligned in a random direction prior to the recording of data signal, even if the direct-current erase is performed on the data band DB2. Hereinafter, aligning in a random direction the direction of the magnetization is defined as "alternating-current erase".

Thereby, since the magnetic particle layer is not being magnetized when performing the recording of data signal after the alternating-current erase (AC erase) of the data band DB2, only the surface layer of the magnetic tape is magnetized. Thus, only the data signal being recorded is reproduced when performing a reproducing, the occurrence of the noise at the time of reproducing can be minimized even if the thickness variation exist on the magnetic particle layer 21.

In these conventional magnetic tape drives, since the AC erase is performed on every data track of the data band DB2, the data track whose data is indispensable is also subjected to the AC erase. Additionally, since the servo signal SS2 being recorded on the servo band SB2 is also subjected to the AC erase, the magnetic head positioning servo control of the magnetic head H2 cannot be achieved.

Therefore, the magnetic head that can minimize the occurrence of a noise at the time of the reproducing of data signal has been required. Additionally, the magnetic tape drive adopting this magnetic head that can minimize the occurrence of a noise at the time of the reproducing of data signal, which is recorded on the data track after performing the AC erase only on the data track onto which data signal is recorded, has been required.

SUMMARY OF THE INVENTION

The present invention relates to a magnetic head of a magnetic tape drive. In this magnetic head, a plurality of head element units are provided along a width direction with respect to a magnetic tape. Each head element unit is provided with at least one recording element for recording data signal on the magnetic tape and at least one reproducing element for reproducing data signal from the magnetic tape. In each head element unit, an AC erase head (alternating current erase head) for performing AC erase (alternating current erase) on a data track of the magnetic tape is positioned upstream in a tape travel direction with respect to the recording element.

In the magnetic head of the present invention, the AC erase element is positioned at upstream in a tape travel direction with respect to the recording element Thus, recording of data signal using the recording element is performed after performing the AC erase only to the data track with which data signal is recorded by the AC erase element.

In this magnetic head, it is preferable the reproducing element of the head element unit is provided at downstream with respect to the recording element.

In this case, since the reproducing element is provided at downstream with respect to the recording element, checking of whether or not data signal has been accurately recorded can be performed using the reproducing element.

In the magnetic head, preferably, the magnetic head includes at least one first head element unit and second head element unit. The first head element unit includes an AC erase element, a recording element, and a reproducing element, which are placed in this order along a tape travel direction. The second head element unit includes an AC erase element, a recording element, and a reproducing element, which are placed in reverse order with regard to those of first head element unit. The first head element unit and the second head element unit are placed alternately along a width direction of the magnetic tape.

In the present invention, still more preferably, the magnetic head includes an AC erase element, a recording element, reproducing element, a recording element, and an AC erase element, which are placed in this order along a tape travel direction.

Additionally, it is preferable that the magnetic head includes a reproducing element, an AC erase element, a recording element, an AC erase element, and a reproducing element, which are placed in this order along a tape travel direction.

The present invention, furthermore, relates to a magnetic tape drive including a magnetic head of above described. This magnetic tape drive includes a tape travel unit to be used for a magnetic tape travel, and an AC erase current generator which supplies an AC erase current for performing an AC erase on a data track of the magnetic tape to respective AC current erase elements provided on the magnetic head.

In this magnetic tape drive, preferably, the magnetic head includes a plurality of head element units which are provided along a width direction with respect to the magnetic tape, wherein each head element unit is provided with at least one recording element for recording data signal on a magnetic tape and at least one reproducing element for reproducing data signal from the magnetic tape. In this magnetic tape drive, the AC erase element is positioned at upstream in a tape travel direction with respect to the recording element.

In this magnetic tape drive, it is preferable that the frequency of AC magnetic field to be caused by the AC erase current is higher than that caused by the recording current.

Additionally, it is still more preferable that AC erase current has a current value enabling to generate a magnetic field sufficient for performing a demagnetization of a magnetic particle layer having a predetermined retentivity of the magnetic tape.

According to the magnetic head of the present invention, a noise at the time of the reproducing can be minimized by reproducing data signal which was recorded on the data track after performing the AC erase on the data track.

Thereby, the deterioration of the recording characteristics of data signal can be avoided, even if the data band is subjected to the AC erase during an AC erase of whole of the magnetic tape that is performed in order to improve the S/N ratio of the readout signal of the servo signal.

According to the present invention, a magnetic tape system, which excels in the recording characteristics of data signal in addition to the improved S/N ratio of the readout signal of the servo signal, can be obtained.

These benefits resulting from the magnetic head can be obtained in the magnetic tape drive adopting the present invention's magnetic head.

BRIEF DESCRIPTION OF THE DRAWINGS

FIG. 6A is an explanatory view showing a recording current being used for writing a servo signal to the conventional magnetic tape possessing a servo signal.

FIG. 6B is a plan view of the conventional magnetic tape possessing a servo signal.

FIG. 6C is an explanatory view showing the recording current in case the peak voltage is large.

FIG. 6D is an explanatory view showing the recording current in case the peak voltage is small.

DETAILED DESCRIPTION OF THE PREFERRED EMBODIMENT

Preferred embodiments of the present invention will be explained with reference to the attached drawings.

First Embodiment

Figure 1:
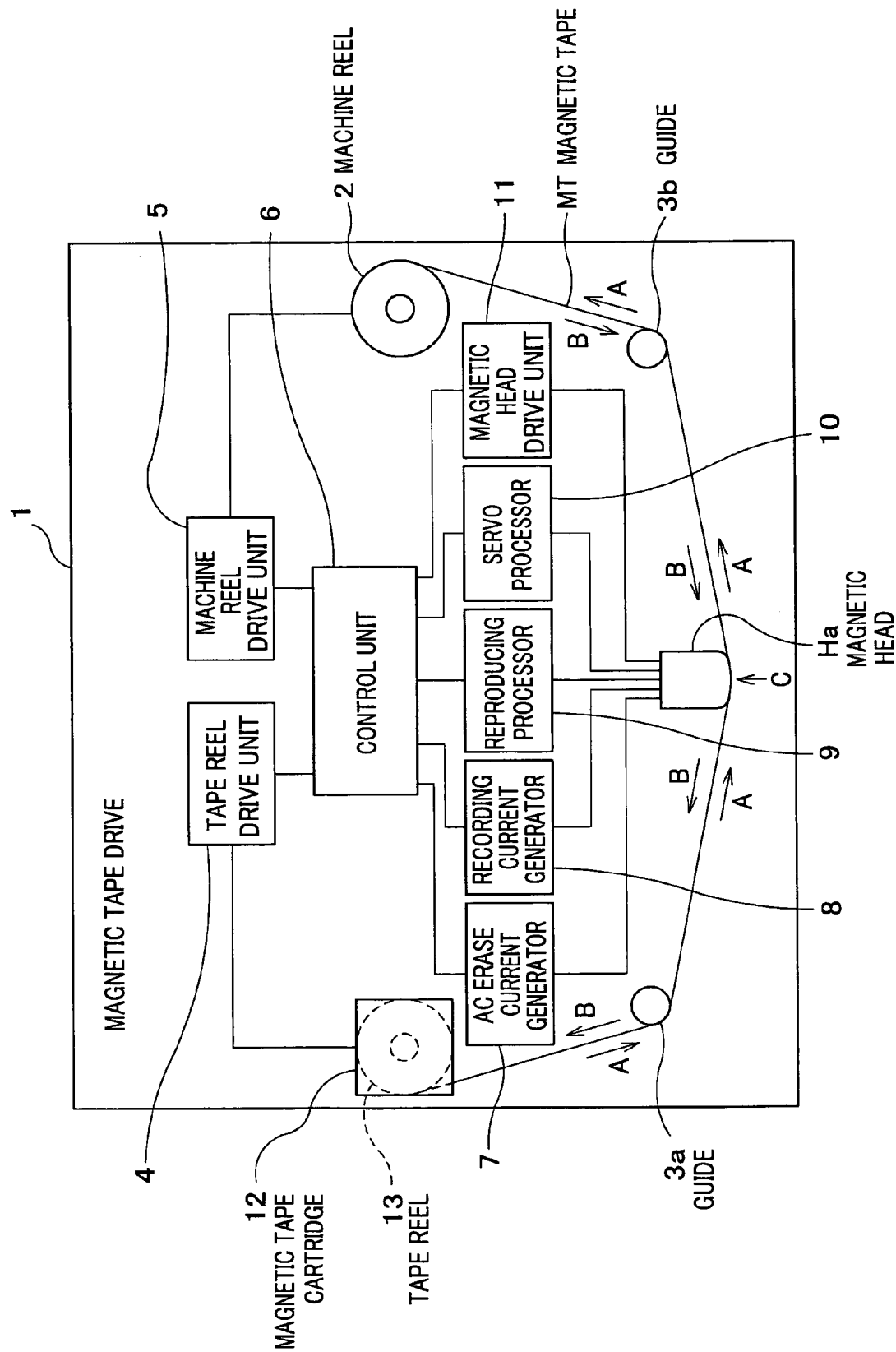
FIG. 1 is a schematic view showing the magnetic tape drive adopting the magnetic head of the present invention.

As shown in FIG. 1, a magnetic tape drive 1 has a machine reel 2, a magnetic head Ha, guides 3a and 3b, a tape reel drive unit 4, a machine reel drive unit 5, a control unit 6, an AC erase current generator 7, a recording current generator 8, a reproducing processor 9, a servo processor 10, and a magnetic head drive unit 11.

In this magnetic tape drive 1, a magnetic tape manager (not shown) and a pullout device (not shown) are provided. Here, the magnetic tape manager is a device that loads a magnetic tape cartridge 12 into the magnetic tape drive 1 and ejects the magnetic tape cartridge 12 from the magnetic tape drive 1. The pullout device is a device that performs the pullout of the magnetic tape MT from the magnetic tape cartridge 12.

In this magnetic tape drive 1, therefore, a leading edge of the magnetic tape MT is pulled out by the pullout device when the magnetic tape cartridge 12 is loaded to the magnetic tape drive 1. Then, the leading edge of the magnetic tape MT pulled out from the magnetic tape cartridge 12 is connected to a hub of the machine reel 2.

In the present embodiment, the adoption of the magnetic tape MT whose data band was subjected to the direct-current erase or the magnetic tape MT whose initial magnetization direction is being directed to a longitudinal direction of the data band maximizes the benefits to be obtained by this invention.

The tape reel drive unit 4 controls the rotation of the tape reel 13 stored in the magnetic tape cartridge 12. The machine reel drive unit 5 controls the rotation of the machine reel 2.

In this magnetic tape drive 1, the magnetic tape MT travels in compliance with the rotation of the tape reel 13 and the machine reel 2, which are respectively driven by the tape reel drive unit 4 and the machine reel drive unit 5, when data signal is recorded on or reproduced from the magnetic tape MT.

In FIG. 1, the travel direction of the magnetic tape MT in cases where the magnetic tape MT is pulled out from the tape reel 13 is indicated by symbol A. The travel direction of the magnetic tape MT in cases where the magnetic tape MT is taken up by the tape reel 13 is indicated by symbol B. In this occasion, the magnetic tape MT travels under the support of guides 3a and 3b, etc.

Next, the magnetic head Ha will be explained with reference to FIG. 2, which is a schematic view showing the magnetic head Ha where the magnetic head Ha is looked from the direction shown by arrow C in FIG. 1.

The magnetic head Ha performs the AC erase (alternating-current erase) of the data track DT provided on the magnetic tape MT, the recording of data signal on the data track DT subjected to the AC erase, the reproducing of data signal recorded on the data track DT, and the readout of the servo signal written on the servo band (not shown).

The magnetic head Ha has a width wider than the width of the magnetic tape MT, and is disposed so that whole of the width direction of the magnetic tape MT is covered with this magnetic head Ha.

When performing the recording or reproducing of data signal, the position in a width direction of the magnetic head Ha is shifted in compliance with the control by the magnetic head drive unit 11 so that each element (will be explained later) of the magnetic head Ha traces the predetermined position in a width direction of the magnetic tape MT.

The magnetic head Ha has a plurality of head element units Ha1, Ha2, Ha3, Ha4 . . . . Each head element unit is provided with an AC erase element E, a recording element W, and a reproducing element R, which are arranged in a line along a travel direction of the magnetic tape MT.

The AC erase element E is used for performing the AC erase on the data track DT, the recording element W is used for recording data signal on the data track DT subjected to the AC erase, and the reproducing element R is used for reproducing data signal being recorded on the data track DT.

Figure 2:
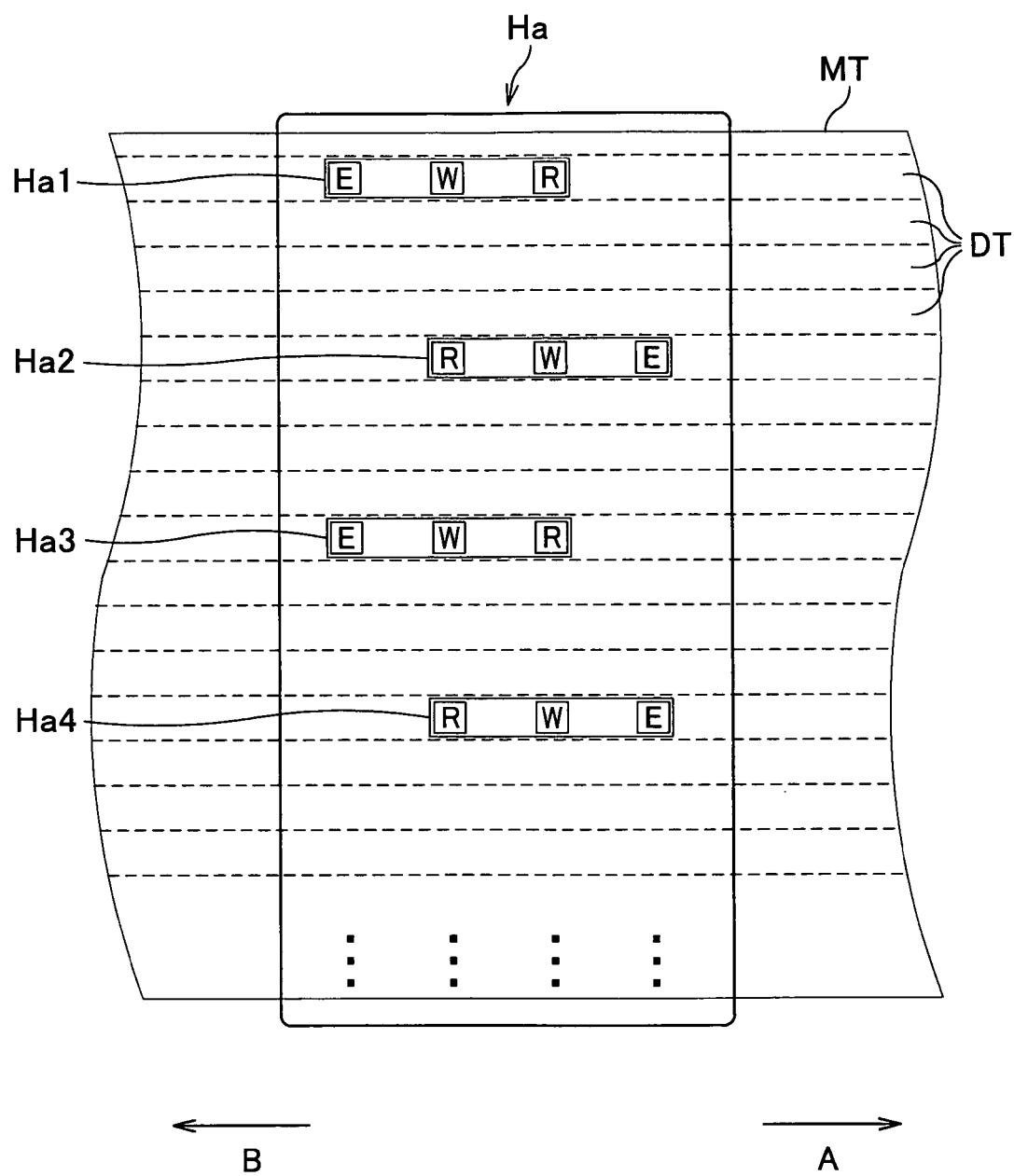
FIG. 2 is a schematic view showing the magnetic head Ha of the first embodiment where the magnetic head Ha is looked from the direction shown by arrow C in FIG. 1.

In this FIG. 2, the size of the data track DT and each head element unit Ha1, Ha2, Ha3 . . . are indicated in an exaggerated form with respect to the magnetic tape MT for understanding with ease. Additionally, the servo read element to be used for reading the servo signal is omitted in FIG. 2.

Each head element unit is arranged in a zigzag configuration along a width direction of the magnetic head Ha. Among them, the head element units Ha1, Ha3, and . . . are used when recording data signal by traveling the magnetic tape MT in the direction shown by arrow A in FIG. 1. On the contrary, the head element units Ha2, Ha4, and . . . are used when recording data signal by traveling the magnetic tape MT in the direction shown by arrow B.

The AC erase element E of each head element unit Ha1, Ha3, and . . . is positioned upstream with respect to the recording element W, when the magnetic tape MT moves in the direction shown by arrow A. On the contrary, the AC erase element E of each head element unit Ha2, Ha4, and . . . is positioned upstream with respect to the recording element W, when the magnetic tape MT moves in the direction shown by arrow B. Thus, the recording of data signal using the recording element W is performed after performing the AC erase only to the data track DT with which data signal is recorded by the AC erase element E.

Here, the reproducing element R is, irrespective of the travel direction of the magnetic tape MT, positioned at downstream with respect to the recording element W to be used for recording data signal. Thus, the checking of whether or not data signal has been accurately recorded can be performed by reproducing (checking) using the reproducing element R.

Figure 7A:
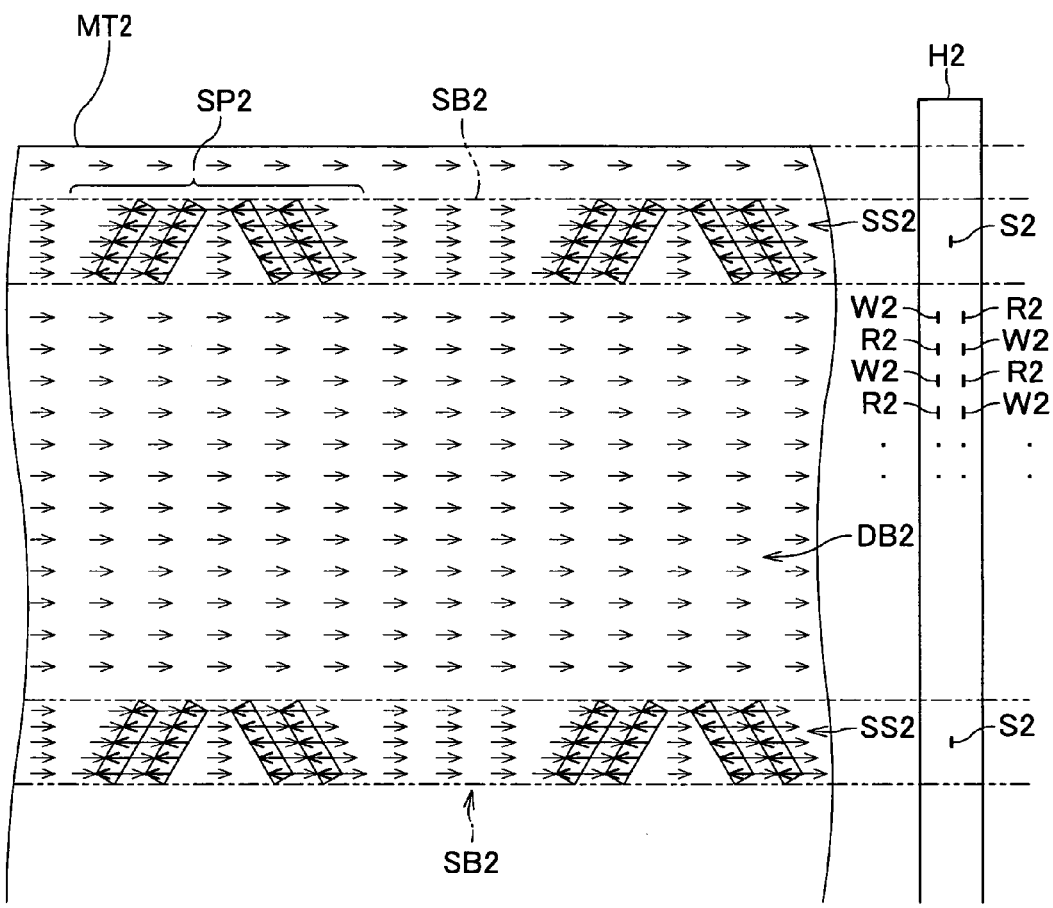
FIG. 7A is an enlarged plan view of the magnetic tape for indicating the magnetization condition (magnetization direction) of the magnetic tape.
Figure 7B:
FIG. 7B is an explanatory view showing a servo read signal (readout signal).
Figure 8:
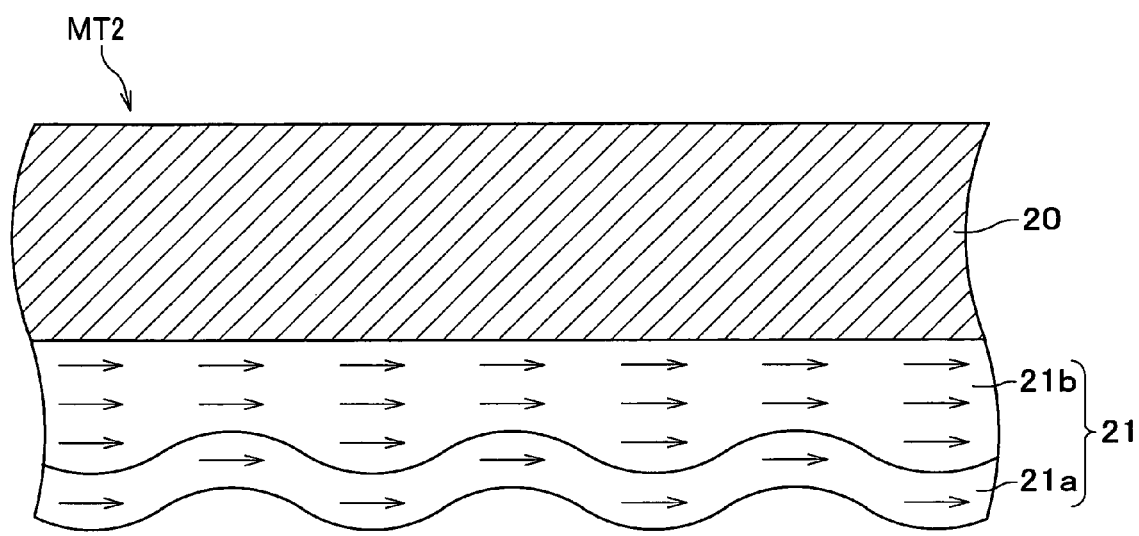
FIG. 8 is a cross sectional view of the magnetic tape.

The magnetic head Ha of the present invention can be manufactured by providing the AC erase element E in addition to the elements of the conventional magnetic head H2 (FIG. 7) That is, the arrangement of respective elements (the reproducing element R, the recording element W, and the AC erase element E) can be represented by arranging the AC erase element E at opposite side alternately with respect to each element (the reproducing element R and the recording element W) of the conventional magnetic head H2. Therefore, the production of the magnetic head Ha can be achieved by using the manufacturing line of the conventional magnetic head H2.

The AC erase current generator 7 is a circuit which supplies AC erase current to respective AC erase elements E provided on the magnetic head Ha. Here, AC erase current is supplied in order to perform the AC erase on the data track DT at the time of the recording.

AC erase current has a current value enabling to generate a magnetic field sufficient for performing the demagnetization of the magnetic particle layer having a retentivity Hc of the magnetic tape MT.

In the present invention, the frequency of the AC magnetic field produced by the AC erase current has to be higher than that produced by the recording current. This is because the recording of an unnecessary signal, due to the AC erase current instead of data signal due to the recording current, has to be prevented. In the present invention, additionally, by the supply of the AC erase current, AC erase can be performed only on the data track DT.

The recording current generator 8 is a circuit, which in case of recording, generates the recording current based on a recording current control signal (recording control signal) entered from the control unit 6, and which supplies the recording control signal to each recording element W of the magnetic head Ha.

The reproducing processor 9 is a circuit, which, in case of reproducing, converts each data signal obtained by each reproducing element R of the magnetic head Ha into a signal (reproduced signal) that can be handled in the control unit 6. Then, the reproducing processor 9 supplies the produced signal to the control unit 6.

The servo processor 10, in case of recording or reproducing, converts the servo signal obtained by the servo read head (not shown) of the magnetic head Ha into signal (readout signal) that can be handled in the control unit 6. Then, the servo processor 10 supplies the readout signal to the control unit 6.

The magnetic head drive unit 11, based on a magnetic head control signal entered from the control unit 6, slides the magnetic head Ha in a direction of the width of the magnetic tape MT. By this slide of the magnetic head Ha, the position of each head element unit to the data track DT with which the reproducing and recording of data signal is performed can be controlled.

The control unit 6 controls the motion of each component of the magnetic tape drive 1. The control unit 6, in case of recording, generates the recording control signal based on data entered from the computer (not shown), and supplies the recording control signal to the recording current generator 8.

The control unit 6, in case of reproducing, converts the data format of the reproduced signal entered from the reproducing processor 9 into the data format that can be handled in the computer, and supplies the data signal to the computer.

Next, the motion of the magnetic head Ha of the magnetic tape drive 1 while recording or reproducing will be explained with reference to FIG. 1 and FIG. 2.

The motion while recording will be explained. Recording of data signal on the data track DT is performed by each head element unit Ha1, Ha3, and . . . while moving the magnetic tape MT in the direction shown by arrow A by the tape reel drive unit 4 and the machine reel drive unit 5. In this occasion, since the magnetic tape MT has a plurality of data tracks DT and the magnetic head Ha is provided with head element units Ha1, Ha3 . . . , the recording of data signal on each data track DT is performed using corresponding recording element of respective head element unit (Ha1, Ha3 . . . ).

Here, the recording of data signal on the data track DT is performed by the recording current which is supplied to each recording element W from the recording current generator 8. In this embodiment, the recording of data signal is performed after performing the AC erase on the data track DT with which data signal is recorded by the AC erase current supplied to each AC erase element E from the AC erase current generator 7. That is, the recording of data signal is performed on the data track DT with which AC erase has been performed.

In the present embodiment, additionally, the checking of whether or not data signal has been accurately recorded on the data track DT is performed just after the recording of data signal by reproducing (checking) the data signal using the reproducing element R. In this occasion, if there is a problem in the data signal being recorded on the data track DT, the recording of data signal is again performed on the data track DT with a trouble.

Next, the magnetic head drive unit 11, in compliance with the magnetic head control signal entered from the control unit 6, moves the magnetic head Ha in a width direction of the magnetic tape MT.

Then, recording of data signal on the data track DT is performed by the magnetic head Ha while moving the magnetic tape MT in the direction shown by arrow B by the tape reel drive unit 4 the machine reel drive unit 5. In this occasion, since the magnetic tape MT has a plurality of data tracks DT and the magnetic head Ha is provided with head element units Ha2, Ha4 . . . , the recording of data signal on each data track DT is performed using corresponding recording element of respective head element units (Ha2, Ha4 . . . ).

On the magnetic tape MT, there is provided a plurality of data tracks DT, and the number of data tracks DT is larger than that of the head element units of the magnetic head. Thus, the recording of data signal on the magnetic tape MT is performed by repeating the recording of data signal along the above described manner while changing the tape travel direction alternately. In other words, when the recording of data signal that is preformed while moving the magnetic tape in one direction is terminated, the tape travel direction is reversed and the position of the magnetic head is shifted in a width direction. Then, the recording of data signal is continued while moving the magnetic tape in reverse direction. By repeating these operations, the recording of data signal on all data tracks DT of the magnetic tape can be achieved.

In the present embodiment, it is preferable to record the information indicating only the AC erase has been performed on a cartridge memory chip (not shown) of the magnetic tape cartridge 12, when only the AC erase of the data track DT has been performed.

Thereby, since the checking of whether or not the AC erase has been performed can be achieved by referring to the information stored in the cartridge memory chip (not shown), the checking of whether or not AC erase is required can be made. Thus, data signal is directly recorded on the data track DT without performing the AC erase prior to the recording of data signal if the AC erase is not required. This enables to save a time necessary for the recording of data signal.

Next, the motion while reproducing will be explained. Reproducing of data signal from the data track DT is performed by each head element unit Ha2, Ha4, and . . . while moving the magnetic tape MT in the direction shown by arrow A by the tape reel drive unit 4 and the machine reel drive unit 5. In this occasion, since a plurality of data tracks DT are provided on the magnetic tape MT and head element unit Ha2, Ha4 . . . are provided on the magnetic head Ha, the reproducing of data signal from each data track DT is performed using corresponding reproducing element R of respective head element units (Ha2, Ha4 . . . ).

In this occasion, since the data signal is being recorded on the data track DT with which AC erase was performed prior to the recording of data signal, the occurrence of the noise while reproducing can be minimized.

Next, the magnetic head drive unit 11, in compliance with the magnetic head control signal entered from the control unit 6, moves the magnetic head Ha in a width direction of the magnetic tape MT.

Then, reproducing of data signal from the data track DT is performed by the reproducing element R while moving the magnetic tape MT in the direction shown by arrow B by the tape reel drive unit 4 and the machine reel drive unit 5. In this occasion, since the magnetic tape MT has a plurality of data tracks DT and the magnetic head Ha is provided with head element units Ha1, Ha3 . . . , the reproducing of data signal from each data track DT is performed using corresponding reproducing element R of respective head element units (Ha1, Ha3 . . . ).

On the magnetic tape MT, there is provided a plurality of data tracks DT, and the number of data tracks DT is larger than that of the head element units of the magnetic head. Thus, the reproducing of data signal from the magnetic tape MT is performed by repeating the reproducing of data signal along the above described manner while changing the tape travel direction alternately.

Second Embodiment

Next, the second preferred embodiment of the present invention will be explained with reference to FIG. 3, which indicates the magnetic head Hb of the second embodiment, and in which the magnetic tape MT is omitted in this FIG. 3.

Figure 3:
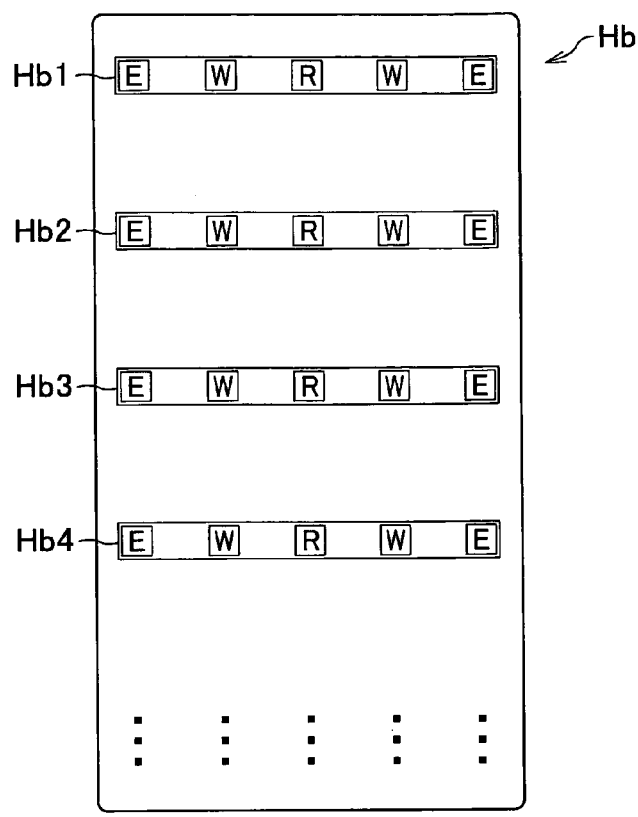
FIG. 3 is a schematic view showing the magnetic head Ha of the second embodiment where the magnetic head Ha is looked from the direction shown by arrow C in FIG. 1.

Here, arrangement in FIG. 3 of each head element unit is similar to that of FIG. 2.

The magnetic head Hb shown in FIG. 3 can be used instead of the magnetic head adopted in the magnetic tape drive 1 explained in the first embodiment. In the following explanation, the same components as those explained in the first embodiment will be indicated by the same reference number and brief explanation thereof will be omitted.

As shown in FIG. 3, the magnetic head Hb has a plurality of head element units Hb1, Hb2, Hb3, Hb4 . . . . Each head element unit is provided with an AC erase element E, a recording element W, a reproducing element R, a recording element W, and an AC erase element E, which are arranged in this order along the travel direction of the magnetic tape MT.

When recording data signal by the magnetic head Hb, that is, when the magnetic tape MT travels in the direction shown by arrow A of FIG. 1, the recording of data signal by the recording element W is performed after performing the AC erase on the data track DT. In this occasion, the AC erase is performed using the AC erase element E positioned in the side of the guide 3a. In other words, this AC erase is performed by using the AC erase element E positioned upstream of the travel direction of the magnetic tape MT.

When the direction of tape travel is reversed and is directed to the direction shown by arrow B in FIG. 1, the recording of data signal by the recording element W is performed after performing the AC erase using the AC erase element E positioned in the side of the guide 3b. That is, the AC erase element E, which is positioned opposite side with respect to the AC erase element E used when the tape travel direction is the direction shown by arrow A, is used for recording data signal.

Thereby, the recording element W is, irrespective of the travel direction of the magnetic tape MT, positioned at downstream with respect to the AC erase element E. Thus, the recording of data signal is performed after the AC erase irrespective of the travel direction of the magnetic tape MT.

Therefore, a time necessary for the recording of data signal performed using the magnetic head Hb can be minimized than that performed using the magnetic head Ha including a single AC erase element and a single recording element W.

On the contrary, when recording data signal by the magnetic head Hb, the reproducing element R is, irrespective of the travel direction of the magnetic tape MT, positioned at downstream with respect to the recording element W. Thus, the checking of whether or not recording of data signal has been surely performed can be achieved by using the reproducing element R.

Third Embodiment

Next, the third embodiment of the present invention will be explained with reference to FIG. 4 which indicates the magnetic head Hc of the third embodiment and in which the magnetic tape MT is omitted. Here, arrangement in FIG. 4 of each head element unit is similar to that of FIG. 2.

Figure 4:
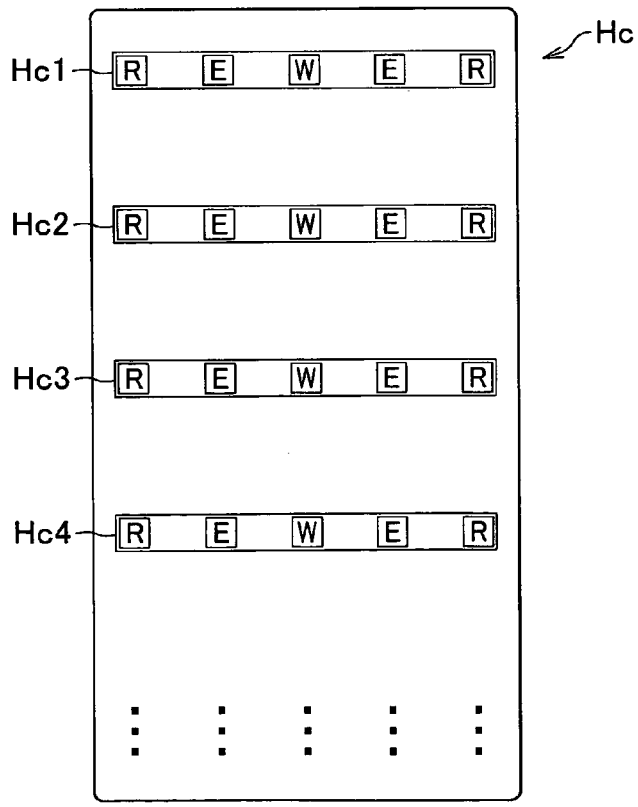
FIG. 4 is a schematic view showing the magnetic head Ha of the third embodiment where the magnetic head Ha is looked from the direction shown by arrow C in FIG. 1.

The magnetic head Hc shown in FIG. 4 can be used instead of the magnetic head Ha adopted in the magnetic tape drive 1 explained in the first embodiment. In the following explanation, the same components as those explained in the first embodiment will be indicated by the same reference number and brief explanation thereof will be omitted.

As shown in FIG. 4, the magnetic head Hc has a plurality of head element units Hc1, Hc2, Hc3, Hc4 . . . . Each head element unit is provided with a reproducing element R, an AC erase element E, a recording element W, an AC erase element E, and a reproducing element R, which are arranged in this order along the travel direction of the magnetic tape MT.

When recording data signal by the magnetic head Hc, that is, when the magnetic tape MT travels in the direction shown by arrow A, the recording of data signal by the recording element W is performed after performing the AC erase on the data track DT. In this occasion, the AC erase is performed using the AC erase element E positioned in the side of guide 3a. In other words, this AC erase is performed by using the AC erase element E positioned upstream of the travel direction of the magnetic tape MT.

When the direction of tape travel is reversed and is directed to the direction shown by arrow B in FIG. 1, the recording of data signal by the recording element W is performed after performing the AC erase using the AC erase element E positioned in the side of the guide 3b.

In the present embodiment, irrespective of the travel direction of the magnetic tape MT, the reproducing element R is positioned downstream with respect to the recording element W. Thereby, the same benefits obtained in the second embodiment can be obtained.

Although there have been disclosed what are the patent embodiments of the invention, it will be understood by persons skilled in the art that variations and modifications may be made thereto without departing from the scope of the invention, which is indicated by the appended claims.

Figure 5:
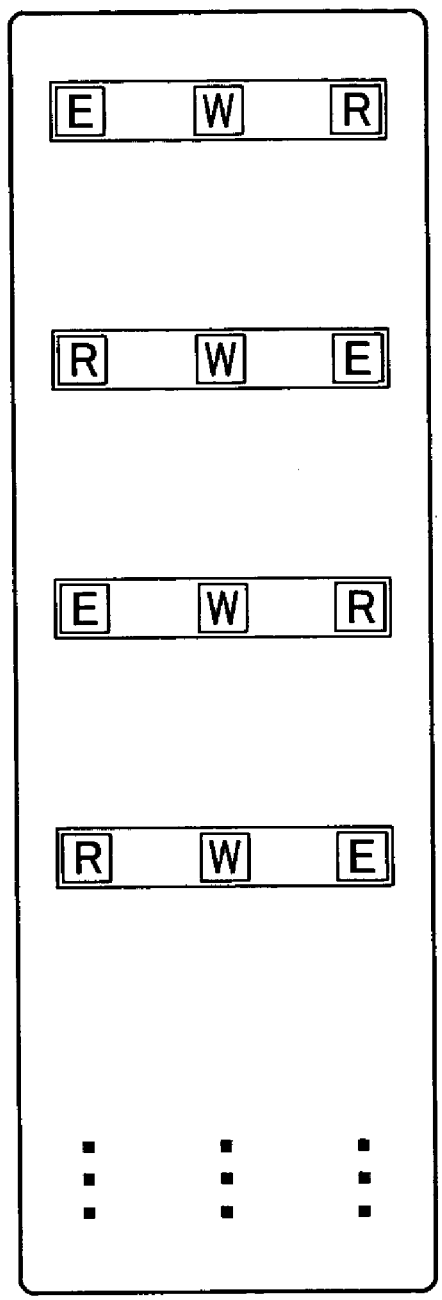
FIG. 5 is a schematic view showing the modified example of the magnetic head Ha of the first embodiment.

As shown in FIG. 5, for example, the magnetic head adopting head element units which are aligned along the width direction of the magnetic tape MT can be used in the magnetic tape drive 1. Only the arrangement of the head element unit of this magnetic head shown in FIG. 5 is different from that shown in FIG. 1. As can be seen from FIG. 5, the magnetic head shown in FIG. 5 can be made by arranging head element units of the magnetic head Ha of FIG. 2 in a line. The total area to be required for head element units can be made smaller than that of the magnetic head Ha, and this allows minimizing the size of the magnetic head.

What is claimed is:

1. A magnet tape drive comprising:
a tape travel unit to be used for a magnetic tape travel;
a magnetic head; and
an AC erase current generator which supplies an AC erase current, for performing an AC erase on a data track of a magnetic tape, to respective AC erase elements provided on the magnetic head, wherein
the magnetic head includes a plurality of head element units which are provided along a width direction with respect to the magnetic tape, wherein
each head element unit is provided with at least one recording element for recording a data signal on the magnetic tape and at least one reproducing element for reproducing a data signal from the magnetic tape, and wherein
the AC erase element is positioned upstream in a tape travel direction with respect to the recording element,
said tape drive further comprising means (7) for generating the AC erase current to produce a magnetic field having a frequency that is higher than the frequency of the data signal, produced by the recording current, which is supplied to the recording element.

2. A magnetic tape drive comprising:
a tape travel unit to be used for a magnetic tape travel;
a magnetic head including a plurality of head element units arranged along a width direction with respect to a magnetic tape, each of the head element units comprising:
at least one recording element for recording a data signal on the magnetic tape,
at least one reproducing element for reproducing the data signal from the magnetic tape,
the recording element and the reproducing element being arranged adjacent to each other, and
an AC erase element for AC erasing one or more data tracks on the magnetic tape, the AC erase element being positioned upstream from the recording and reproducing elements in a tape travel direction of the magnetic tape; and
an AC erase current generator which supplies to each AC erase element an AC erase current for performing an AC erase on the data tracks of the magnetic tape, and for producing an AC magnetic field having a higher frequency than that produced by a recording current supplied to the recording element.

3. A magnetic tape drive according to claim 2, wherein the reproducing element of each head element unit is positioned downstream in the tape travel direction with respect to the recording element.

4. A magnetic tape drive according to claim 3 wherein the AC erase current has a current value enabling to generate a magnetic field sufficient for performing a demagnetization of a magnetic particle layer, having a predetermined retentivity, of the magnetic tape.

5. A magnetic tape drive according to claim 2, wherein the magnetic head includes at least one first head element unit and one second head element unit which are placed alternately along the width direction of the magnetic tape,
the first head element unit includes an AC erase element, a recording element, and a reproducing element, which are placed in this order along the tape travel direction, and
the second head element unit includes an AC erase element, a recording element, and a reproducing element, which are placed in reverse order with regard to that of the first head element unit.

6. A magnetic tape drive according to claim 5 wherein the AC erase current has a current value enabling to generate a magnetic field sufficient for performing a demagnetization of a magnetic particle layer, having a predetermined retentivity, of the magnetic tape.

7. A magnetic tape drive according to claim 2, wherein the head element unit includes a first AC erase element, a recording element, a reproducing element, a recording element, and a second AC erase element, which are placed in this order along the tape travel direction.

8. A magnetic tape drive according to claim 7 wherein the AC erase current has a current value enabling to generate a magnetic field sufficient for performing a demagnetization of a magnetic particle layer, having a predetermined retentivity, of the magnetic tape.

9. A magnetic tape drive according to claim 2, wherein the head element unit include a reproducing element, a first AC erase element, a recording element, a second AC erase element, and a reproducing element, which are placed in this order along the tape travel direction.

10. A magnetic tape drive according to claim 9 wherein the AC erase current has a current value enabling to generate a magnetic field sufficient for performing a demagnetization of a magnetic particle layer, having a predetermined retentivity, of the magnetic tape.

11. A magnetic tape drive according to claim 2, wherein the AC erase current has a current value enabling to generate a magnetic field sufficient for performing a demagnetization of a magnetic particle layer, having a predetermined retentivity, of the magnetic tape.

12. The magnetic tape drive according to claim 2, wherein servo tracks and the data tracks on the magnetic tape are subjected to DC erasing upstream of the AC erase element.

* * * * *